United States Patent
Wu et al.

(10) Patent No.: US 10,148,325 B2
(45) Date of Patent: Dec. 4, 2018

(54) METHODS OF BEAM-INDEXED SPATIAL MODULATION

(71) Applicants: National Taiwan University, Taipei (TW); MediaTek Inc., Hsinchu (TW)

(72) Inventors: Jen-Ming Wu, Hsinchu (TW); Liang-Kai Chang, Hsinchu County (TW); Jian-Wei Wu, Hsinchu (TW); Yu-Hsuan Hu, Hsinchu (TW)

(73) Assignees: NATIONAL TAIWAN UNIVERSITY, Taipei (TW); MEDIATEK INC., Hsinchu, Hsinchu (TW)

(*) Notice: Subject to any disclaimer, the term of this patent is extended or adjusted under 35 U.S.C. 154(b) by 0 days.

(21) Appl. No.: 15/720,507

(22) Filed: Sep. 29, 2017

(65) Prior Publication Data

US 2018/0309481 A1 Oct. 25, 2018

(30) Foreign Application Priority Data

Apr. 21, 2017 (TW) .............................. 106113519 A

(51) Int. Cl.
| | |
|---|---|
| *H04L 25/40* | (2006.01) |
| *H04B 1/38* | (2015.01) |
| *H04B 1/10* | (2006.01) |
| *H04L 25/08* | (2006.01) |
| *H04B 7/0413* | (2017.01) |
| *H04L 5/00* | (2006.01) |
| *H04L 27/34* | (2006.01) |
| *H04B 7/02* | (2018.01) |

(52) U.S. Cl.
CPC ........... *H04B 7/0413* (2013.01); *H04B 7/028* (2013.01); *H04L 5/0007* (2013.01); *H04L 27/3405* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,280,444 B1* | 10/2012 | Shen | ....................... | H04B 7/024 455/561 |
| 8,320,301 B2* | 11/2012 | Walton | ................... | H04B 7/022 370/328 |
| 9,059,754 B2* | 6/2015 | Zhang | .................. | H04B 7/0617 |
| 9,240,871 B2* | 1/2016 | Walton | ................... | H04B 7/022 |

(Continued)

OTHER PUBLICATIONS

David Tse, Fundamentals of Wireless Communication MIMO I: Spatial Multiplexing and channel modeling, 2005, Cambridge University Press, pp. 290-331, https://web.stanford.edu/~dntse/wireless_book.html (Year: 2005).*

*Primary Examiner* — Linda Wong
(74) *Attorney, Agent, or Firm* — Muncy, Geissler, Olds & Lowe, P.C.

(57) ABSTRACT

This invention provides methods of beam-indexed spatial modulation (BISM) for multiple-input and multiple-output (MIMO) technology. It does not only enhance the efficiency of MIMO using, but also address the compatibility problems in Spatial Modulation (SM-MIMO) and Orthogonal Frequency Division Multiplexing Index Modulation (OFDM-IM). Furthermore, the BISM improves the speed limitation problem and spectral efficiency issue in the current spatial modulation architectures.

7 Claims, 18 Drawing Sheets

(56) References Cited

U.S. PATENT DOCUMENTS

| | | | | |
|---|---|---|---|---|
| 9,312,935 B2* | 4/2016 | Ketchum | | H04B 7/0421 |
| 9,844,061 B2* | 12/2017 | Shattil | | H04B 7/0456 |
| 2003/0128658 A1* | 7/2003 | Walton | | H04L 1/06 |
| | | | | 370/208 |
| 2003/0235255 A1* | 12/2003 | Ketchum | | H04B 7/0417 |
| | | | | 375/285 |
| 2006/0039312 A1* | 2/2006 | Walton | | H04L 1/06 |
| | | | | 370/319 |
| 2007/0268181 A1* | 11/2007 | Howard | | H01Q 21/00 |
| | | | | 342/368 |
| 2010/0166100 A1* | 7/2010 | Medvedev | | H04B 7/0417 |
| | | | | 375/267 |
| 2010/0322223 A1* | 12/2010 | Choi | | H04B 7/0452 |
| | | | | 370/342 |
| 2013/0010889 A1* | 1/2013 | Ponnampalam | | H04B 7/0626 |
| | | | | 375/267 |
| 2013/0089159 A1* | 4/2013 | Liu | | H04B 7/024 |
| | | | | 375/267 |
| 2013/0188677 A1* | 7/2013 | Howard | | H04B 7/0421 |
| | | | | 375/219 |
| 2013/0287069 A1* | 10/2013 | Su | | H04B 7/0413 |
| | | | | 375/219 |
| 2014/0036655 A1* | 2/2014 | Zhang | | H04B 7/0617 |
| | | | | 370/210 |
| 2014/0341048 A1* | 11/2014 | Sajadieh | | H04L 5/0085 |
| | | | | 370/252 |
| 2014/0348258 A1* | 11/2014 | Walton | | H04B 7/022 |
| | | | | 375/267 |
| 2014/0362944 A1* | 12/2014 | Zhang | | H04B 7/0617 |
| | | | | 375/267 |
| 2015/0208251 A1* | 7/2015 | Lim | | H04B 7/0456 |
| | | | | 370/328 |
| 2015/0229436 A1* | 8/2015 | Grant | | H04B 7/061 |
| | | | | 370/252 |
| 2015/0282122 A1* | 10/2015 | Kim | | H04L 25/03898 |
| | | | | 370/329 |
| 2015/0365147 A1* | 12/2015 | Ketchum | | H04B 7/0421 |
| | | | | 370/329 |
| 2016/0119044 A1* | 4/2016 | Shattil | | H04W 12/08 |
| | | | | 375/267 |
| 2016/0127940 A1* | 5/2016 | Golitschek Edler von Elbwart | | H04L 1/0026 |
| | | | | 370/329 |
| 2016/0134339 A1* | 5/2016 | Tong | | H04B 7/0617 |
| | | | | 375/267 |
| 2016/0285660 A1* | 9/2016 | Frenne | | H04L 27/261 |
| 2016/0323029 A1* | 11/2016 | Cheng | | H04B 7/0626 |
| 2016/0359531 A1* | 12/2016 | Suh | | H04B 7/0452 |
| 2017/0005711 A1* | 1/2017 | Yu | | H04B 7/0617 |
| 2017/0012692 A1* | 1/2017 | Kim | | H04B 7/0695 |
| 2017/0047974 A1* | 2/2017 | Vu | | H04B 7/0465 |
| 2017/0170885 A1* | 6/2017 | Li | | H04B 7/0617 |
| 2017/0195012 A1* | 7/2017 | Suh | | H04B 7/0452 |
| 2017/0195030 A1* | 7/2017 | Yoshimura | | H04B 7/04 |
| 2017/0195084 A1* | 7/2017 | Kwak | | H04B 7/0408 |
| 2017/0222702 A1* | 8/2017 | Tong | | H04B 7/0617 |
| 2017/0257230 A1* | 9/2017 | Son | | H04B 7/04 |
| 2017/0303265 A1* | 10/2017 | Islam | | H04B 7/0639 |
| 2017/0310374 A1* | 10/2017 | Kim | | H04B 7/0452 |
| 2017/0331539 A1* | 11/2017 | Pham | | H04B 7/0417 |
| 2018/0109303 A1* | 4/2018 | Yoo | | H04B 7/0695 |
| 2018/0159600 A1* | 6/2018 | Kim | | H04B 7/0617 |
| 2018/0167115 A1* | 6/2018 | Zhu | | H04B 7/0478 |
| 2018/0198499 A1* | 7/2018 | Park | | H04B 7/04 |

* cited by examiner

| MIMO | Subcarrier index for N-IFFT | | | | | BISM | Subcarrier index for N-IFFT | | | | |
|---|---|---|---|---|---|---|---|---|---|---|---|
| | 5 | 4 | 3 | 2 | 1 | | 5 | 4 | 3 | 2 | 1 |
| 1$^{st}$ stream ······ | $x_1$ | $x_1$ | $x_1$ | $x_1$ | $x_1$ | 1$^{st}$ stream ······ | $x_1$ | $x_1$ | 0 | $x_1$ | $x_1$ |
| 2$^{nd}$ stream ······ | $x_2$ | $x_2$ | $x_2$ | $x_2$ | $x_2$ | 2$^{nd}$ stream ······ | $x_2$ | $x_2$ | $x_1$ | $x_2$ | 0 |
| 3$^{rd}$ stream ······ | $x_3$ | $x_3$ | $x_3$ | $x_3$ | $x_3$ | 3$^{rd}$ stream ······ | $x_3$ | 0 | $x_2$ | 0 | $x_2$ |
| 4$^{th}$ stream ······ | $x_4$ | $x_4$ | $x_4$ | $x_4$ | $x_4$ | 4$^{th}$ stream ······ | 0 | $x_3$ | $x_3$ | $x_3$ | $x_3$ |

Fig. 10

| | Subcarrier index for N-IFFT | | | | | | | | | | | | | | | |
|---|---|---|---|---|---|---|---|---|---|---|---|---|---|---|---|---|
| | 16 | 15 | 14 | 13 | 12 | 11 | 10 | 9 | 8 | 7 | 6 | 5 | 4 | 3 | 2 | 1 |
| 1st stream | $x_1$ | $x_5$ | $x_9$ | $x_{12}$ | $x_1$ | $x_5$ | $x_9$ | $x_{13}$ | $x_1$ | 0 | $x_8$ | $x_{12}$ | $x_1$ | $x_5$ | $x_9$ | $x_{12}$ |
| 2nd stream | $x_2$ | $x_6$ | $x_{10}$ | $x_{13}$ | $x_2$ | $x_6$ | $x_{10}$ | $x_{14}$ | $x_2$ | $x_5$ | $x_9$ | $x_{13}$ | $x_2$ | $x_6$ | 0 | $x_{13}$ |
| 3rd stream | $x_3$ | $x_7$ | 0 | $x_{14}$ | $x_3$ | $x_7$ | $x_{11}$ | $x_{15}$ | $x_3$ | $x_6$ | $x_{10}$ | $x_{14}$ | $x_3$ | $x_7$ | $x_{10}$ | $x_{14}$ |
| 4th stream | $x_4$ | $x_8$ | $x_{11}$ | $x_{15}$ | $x_4$ | $x_8$ | $x_{12}$ | 0 | $x_4$ | $x_7$ | $x_{11}$ | $x_{15}$ | $x_4$ | $x_8$ | $x_{11}$ | $x_{15}$ |

Fig. 17

METHODS OF BEAM-INDEXED SPATIAL MODULATION

CROSS-REFERENCE TO RELATED APPLICATIONS

This Non-provisional application claims priority under 35 U.S.C. § 119(a) on Patent Application No(s). [TW106113519] filed in Taiwan, Republic of China [Apr. 21, 2017], the entire contents of which are hereby incorporated by reference.

FIELD OF THE INVENTION

This invention relates to methods of beam-indexed spatial modulation provided, in particular, for MIMO.

BACKGROUND OF THE INVENTION

The demand for wireless telecommunication performance is increasing rapidly. People not only request for a higher speed communication, but also want to enjoy a wide and diverse coverage of services. Because of these demands, researchers have been looking for new technologies to improve the efficiency on communication. The efforts have been put to obtain a higher degree of spectral and energy efficiencies, and/or be able to flexibly adjust the combinations of the two. It is necessary to improve the flexibility and efficiency in systems used in the telecommunication.

It is believed that the technology of index modulation ("IM") for multiple-input and multiple-out ("MIMO") and multiple carriers are both of potential to be adopted in the next generation wireless communication systems. In the past few years, the IM related researches have gained more and more attention because of the theoretical advantages. In the context of IM, the indices of the resources in a considered communication system are used to convey additionally information bits. Thus, it facilitates the digital modulation scheme to achieve higher spectral and energy efficiencies.

The two state-of-the-art applications for IM are 1) spatial modulation ("SM") and 2) orthogonal frequency division multiplexing with IM ("OFDM-IM") schemes. In the respect of SM, the corresponding index modulated building blocks are the transmit antennas of a MIMO system. As to OFDM-IM, the corresponding index modulated building blocks are the subcarriers of an OFDM system.

The two above applications are problematic. The SM relies on combinations of antennas to carry out index modulation. However, it requires hardware components to switch the selected antennas on-and-off and consequently limits the processing speeds substantially. Further, SM is incompatible to OFDM-based communication systems because the antennas' switching would affect all of the subcarriers simultaneously. This incompatibility issue makes SM unfit for current communication systems. As for OFDM-IM, it does not efficiently exploit the degree-of-freedom which MIMO can provide.

Terminologies and Definition

Massive MIMO

MIMO is a technology that transmits signals individually via each antenna at a transmitter end and individually receiving and recovering the signals via each antenna at a receiver end. In the mobile phone technology, the number of antennas in a base station (i.e. a transmitter end) is usually more than the number of mobile phone terminals (i.e. receiver ends).

According to the study of 5G telecommunication, massive MIMO technology is advantageous. It will not only accommodate for more mobile terminals because of its high transmission speed, but also reduce power consumptions while maintain its stability.

Antenna Selection

It is to select the most "favorable" antenna(s) (for transmit-receive links) while turning off the rest. The selection is made based on, for instance, the maximum signal-to-noise ratio, channel diversity or maximum channel capacity, etc.

Spatial Modulation MIMO (SM-MIMO)

SM-MIMO maps the information bits into the index modulated symbol corresponding to an active antenna index. Thereby, the antenna array pattern can be interpreted as a spatial constellation diagram.

Conventionally, modulation techniques map a fixed number of information bits into one M-QAM symbol. Each symbol represents a constellation point in the complex, two dimensional signal space. The SM-MIMO extends the two dimensional signal space into a third dimension, i.e. the spatial dimension. The receiver detects the symbol and the number of the active antennas; then it de-maps the original information bits. Mesleh et al. and Jeganathan et al. inspirit the development of SM. Ever since then numerous of papers discussing about SM have been published. These prior arts focus on generalized, spectral and energy-efficient SM technologies and low-complexity detector types.

Assuming $N_T$ is the number of available antennas for transmission, $n_T=1$ is the number of selected active antenna and M is the order of M-ary QAM constellation. The achievable spectral efficiency R is:

$$R=\log_2(N_T)+\log_2(M) bps$$

The value R represents how much data volume can be transmitted in a given bandwidth of the communication system. By using a single RF chain, SM is of lower complexity and high degree of energy efficiency. Further, SM also solves issues such as inter-channel interference (ICI), inter-antenna synchronization (IAI) and multiple RF chains occurred at the transmitter.

A BER comparison of SM-MIMO with VBLAST MIMO and the maximum ratio combining (MRC) MIMO is depicted in FIG. 1. As shown, the performance of SM-MIMO is better than the others.

Generalized Spatial Modulation MIMO (GSM-MIMO)

FIG. 2 shows an GSM-MIMO block diagram under which more than one antennas are activated (i.e. $n_T \geq 1$). M-QAM symbols are transmitted on the activated antennas. The SM therefore becomes "generalized" SM and the spectral efficiency R is:

$$R = \left\lfloor \log_2 \binom{N_T}{n_T} \right\rfloor + n_T \log_2(M)$$

where $\lfloor \ \rfloor$ represents the floor operation.

An GSM encoding example is shown in Table 1 where $N_T=4$ and $n_T=3$. The spatial bits (i.e. information bits) are mapped to the indices of the active antennas and $x_1, \ldots, x_4$ are QAM symbols.

TABLE 1

GSM Encoding Example

| Indices of Active Antennas | Spatial Bits | GSM codeword |
|---|---|---|
| 2, 3, 4 | 00 | $[0, x_2, x_3, x_4]^T$ |
| 1, 3, 4 | 01 | $[x_1, 0, x_3, x_4]^T$ |
| 1, 2, 4 | 10 | $[x_1, x_2, 0, x_4]^T$ |
| 1, 2, 3 | 11 | $[x_1, x_2, x_3, 0]^T$ |

GSM-MIMO technology helps reduce the number of active antennas for transmission; consequently the energy efficiency is improved. Further, when different numbers of antennas are activated, the choices between the energy efficiency and the spectral must be traded off. In GSM-MIMO, the sacrifice of spectral efficiency is compensated by the index modulation symbols. Moreover, GSM-MIMO requires only a single RF chain but can achieve a higher degree of diversity gain because it can transmit the same symbol over the active antenna(s).

Orthogonal Frequency Division Multiplexing-Index Modulation (OFDM-IM)

The idea of applying IM to OFDM architecture is proposed that using subcarrier indexing in the modulation. It has drawn attention in recent years as an alternative to the conventional OFDM. Issues such as error performance, capacity analysis for OFDM-IM and its applications on various wireless telecommunications are discussed in some newly published articles. They are incorporated as references to this invention.

FIG. 3 illustrates a block diagram of OFDM-IM where a subset of available subcarriers is selected to be active based on the information bits. The unselected subcarriers (i.e. which are inactive) are set to zero. Assuming an OFDM system has N subcarriers. The N subcarriers are divided into a number of G OFDM-IM sub-blocks which is smaller and manageable. Each sub-block contains a number of $N_c$ subcarriers to perform IM, where $N=G \times N_c$.

For each sub-block, $n_0$ out of $N_c$ available subcarriers are selected to be active subcarriers based on the $p_1$ index selection bits. Each active subcarriers sends M-QAM modulation symbols according to the $p_2$ modulation bits. For each OFDM-IM frame, its spectral efficiency R is:

$$R = \left( \left\lfloor \log_2 \binom{N_c}{n_0} \right\rfloor + n_0 \log_2(M) \right) G$$

where $$p_1 = \left\lfloor \log_2 \binom{N_c}{n_0} \right\rfloor \text{ (bits/Hz), and } p_2 = n_0 \log_2 M \text{ (bits/Hz)}.$$

An uncoded BER performance of a MIMO-OFDM-IM and a typical MIMO-OFDM for three MIMO configurations $n_T \times n_R = 2 \times 2$; $4 \times 4$; and $8 \times 8$ are illustrated in FIG. 4. The OFDM system parameters are M=2 (BPSK), N=4, K=2, $N_F$=512, CP length=16. The frequency-selective Rayleigh fading channel is modeled with 10 taps. The system applies the successive MMSE detection in the receiver.

SUMMARY OF INVENTION

In view of the problems occurred in the current SM-MIMO and OFDM-IM communication systems, this invention presents the method of beam-indexed spatial modulation for a MIMO module. The MIMO module has a transmitter end and a receiver end.

One embodiment of the present invention includes the following steps (shown in FIG. 5).

Step (a) confirming that the MIMO module has a plurality of beams, which number is $N_B$, each of the beams is an individual channel constituted by the antennas at the transmitter end and the antennas at the receiver end.

Step (b) providing an index to the $N_B$ beams through a channel matrix H. In one embodiment, the index may be represented either by M-ary quadrature amplitude modulation symbols or spatial bits, which preferably are in binary. The channel matrix H can be decomposed by the singular value decomposition and represented by $$H = U\Lambda V^H = \sum_{i=1}^{N_B} \sigma_i u_i v_i^H$$

wherein U and V are unitary matrices, $\Lambda$ is an $N_B \times N_B$ diagonal matrix with singular values $\sigma_i = \sigma_1, \sigma_2, \ldots, \sigma_{N_B}$ of the MIMO module.

In another embodiment, the channel matrix H can also be decomposed by the angular steering vectors and represented by $$H = \sum_{i=1}^{N_B} a_i e_r(\Omega_{ri}) e_t^*(\Omega_{ti})$$

where $a_i$ is an attenuation of the i-th beam, $e_t(\Omega_{ti})$ is a angular steering vector of angle of departure representing by $$e_t(\Omega_{ti}) = \frac{1}{\sqrt{N_T}} [1, \exp(-j2\pi\Delta_t\Omega_{ti}),$$

$$\exp(-j2\pi 2\Delta_t\Omega_{ti}), \ldots, \exp(-j2\pi(N_T-1)\Delta_t\Omega_{ti})]^T$$

$e_r(\Omega_{ri})$ is a angular steering vector of angle of arrival representing by $$e_r(\Omega_{ri}) = \frac{1}{\sqrt{N_R}} [1, \exp(-j2\pi\Delta_r\Omega_{ri}),$$

$$\exp(-j2\pi 2\Delta_r\Omega_{ri}), \ldots, \exp(-j2\pi(N_R-1)\Delta_r\Omega_{ri})]^T$$

where $\Delta_t$ is the distance between two of the antennas at the transmitter end, $\Delta_r$ is the distance between two of the antennas at the receiver end, $\Omega_{ti} = \cos(\varphi_{ti})$ is cosine of the angle of departure at the transmitter end, and $\Omega_{ri} = \cos(\varphi_{ri})$ is cosine of the angle of arrival at the receiver end.

Step (c) evaluating communication statuses of the beams and selecting a plurality of sub-channels, which number is $n_B$, out of the channels as transmit beams to transmit. In one embodiment, the number of transmit beams equals to the number of sub-channel (i.e. $n_B$) plus one. Preferably, the index includes a zero bit to represent those unselected sub-channels. Transmitting a signal and the index via the transmit beams at the transmitter end.

Step (d) receiving and recognizing the index at the receiver end, and further receiving the signal via the transmit beams at the receiver end.

Unlike SM architectures, BISM is compatible with OFDM and the index modulation can be implemented in the baseband at symbol rate which is as fast as the sampling rate. With comparison to OFDM-IM, BISM exploits the degrees-of-freedom of the MIMO channels and the spectral efficiency is further improved.

BRIEF DESCRIPTION OF THE DRAWINGS

FIG. 10 exemplarily demonstrates performing BISM on MIMO.

FIG. 17 is an exemplary joint design of BISM and OFDM-IM system.

DETAILED DESCRIPTION OF THE INVENTION

Figure 1:
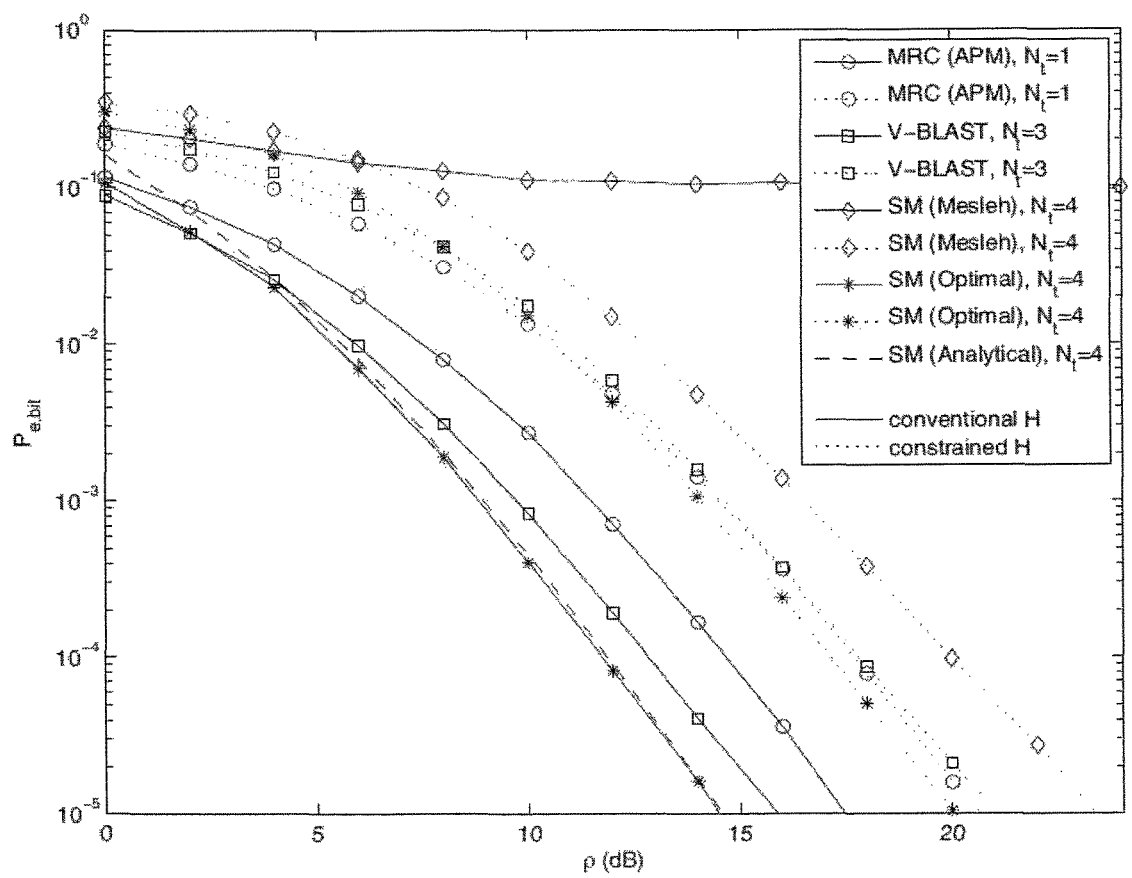
FIG. 1 shows a BER comparison of SM-MIMO with VBLAST MIMO detection scheme and maximum ratio combining (MRC) MIMO detection scheme.
Figure 2:
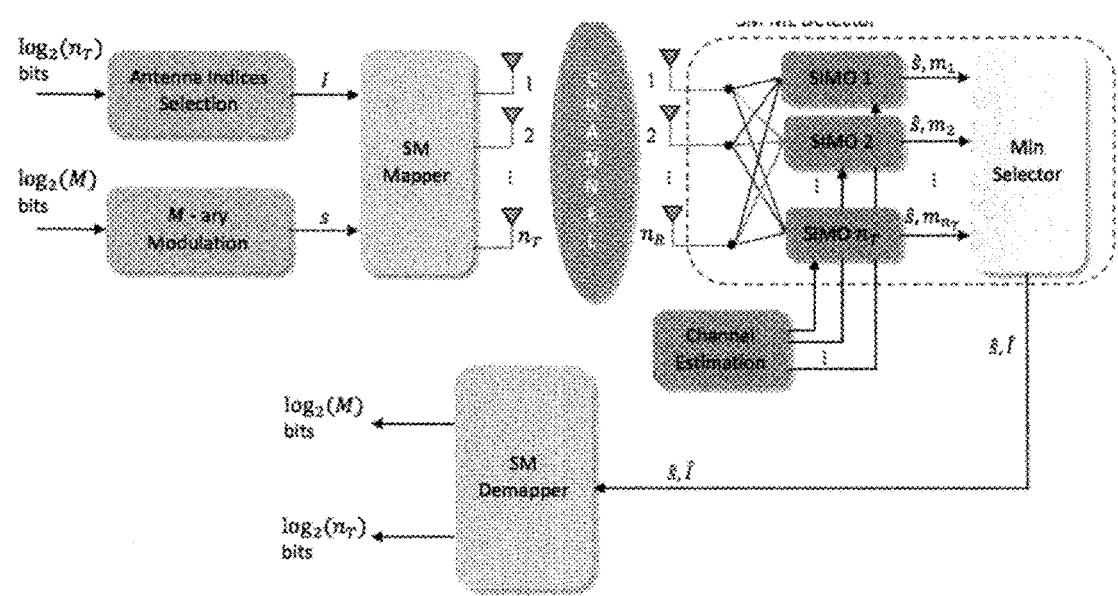
FIG. 2 shows an GSM-MIMO block diagram under which more than one antennas are activated (i.e. $n_T \geq 1$) and M-QAM symbols are transmitted on the activated antennas.
Figure 3:
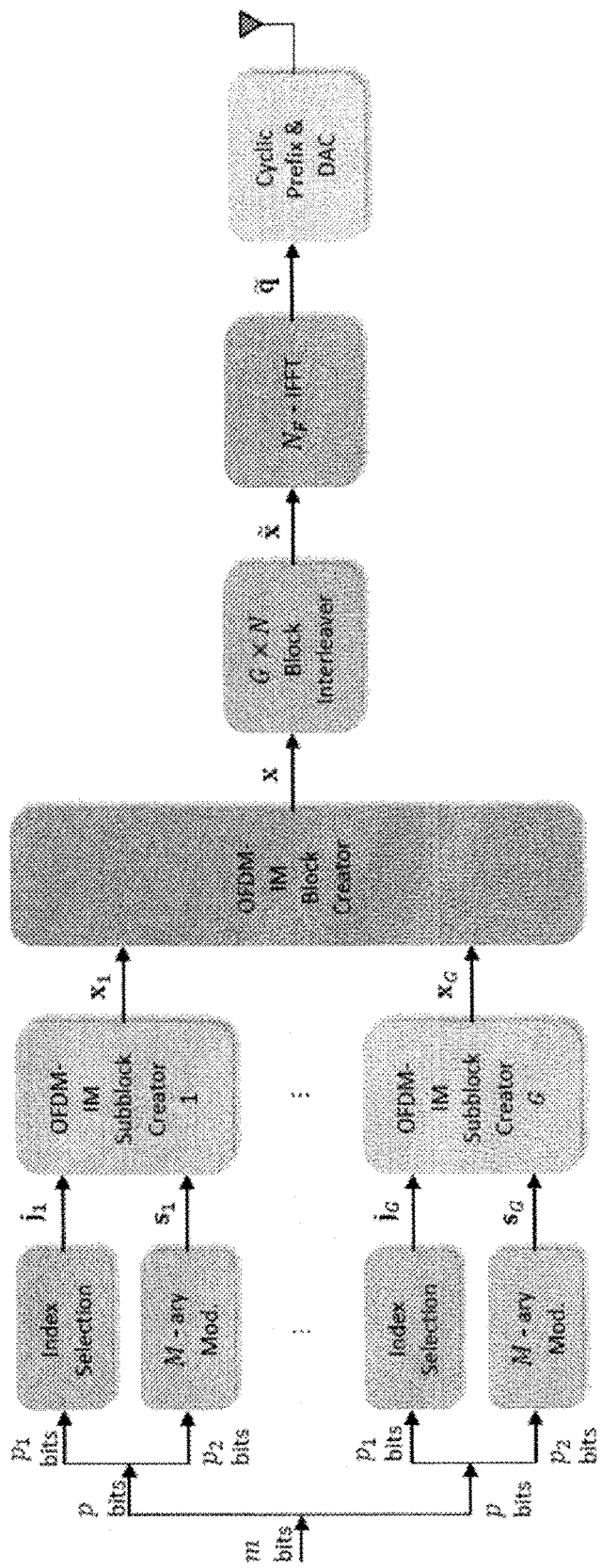
FIG. 3 illustrates a block diagram of OFDM-IM where a subset of available subcarriers is selected to be active based on the information bits.
Figure 4:
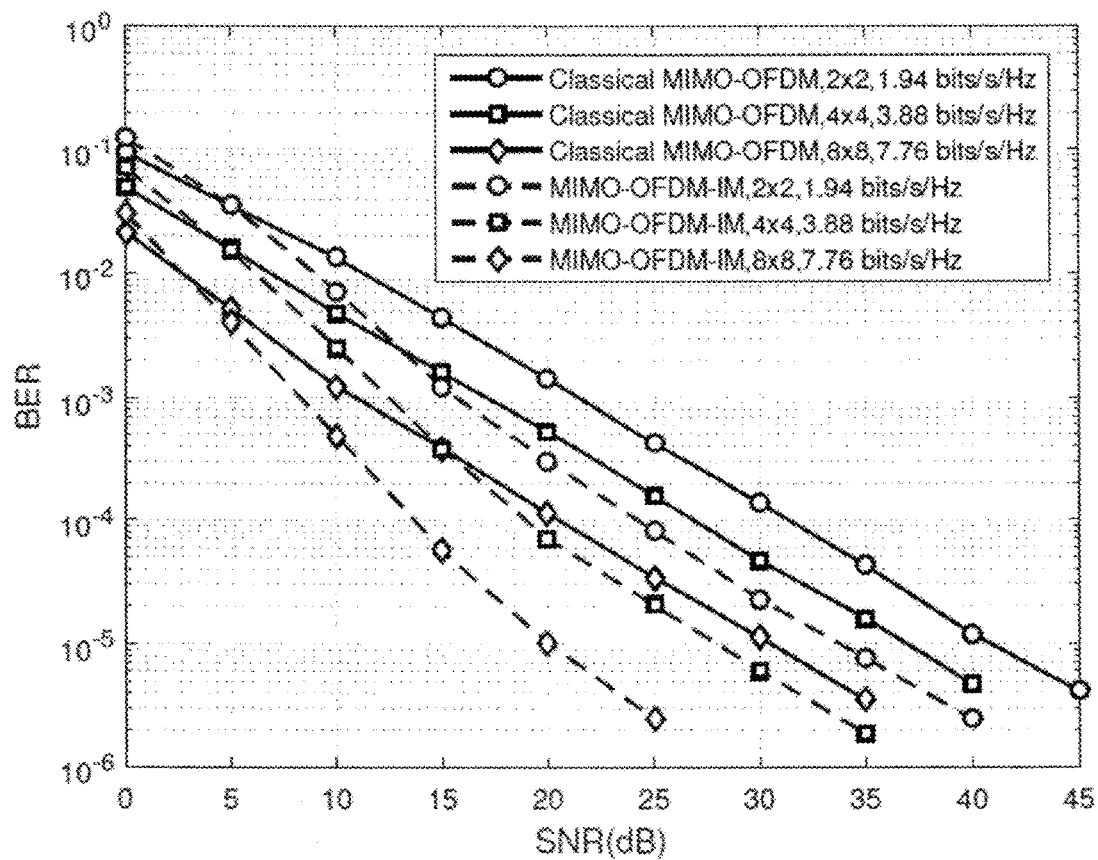
FIG. 4 illustrates an uncoded BER performance of a MIMO-OFDM-IM and a typical MIMO-OFDM schemes for three MIMO configurations $n_T \times n_R = 2 \times 2$; $4 \times 4$, and $8 \times 8$.
Figure 5:
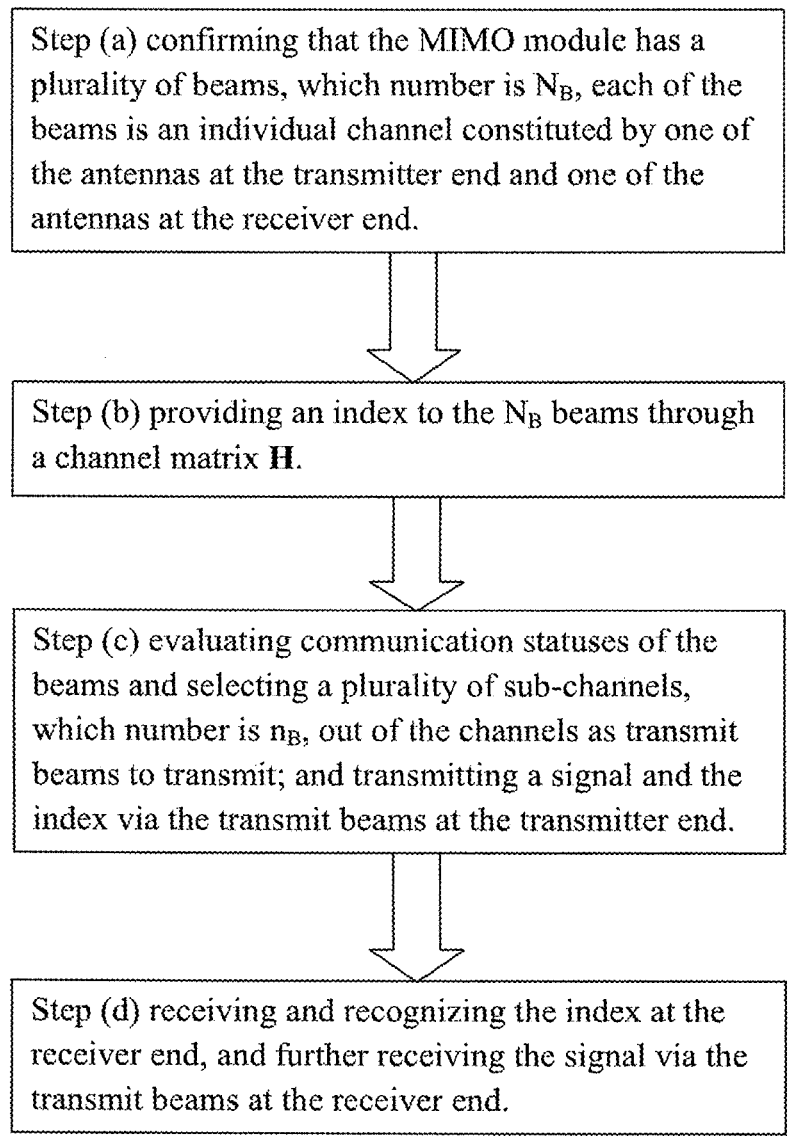
FIG. 5 shows a flow chart of the present invention.
Figure 6:
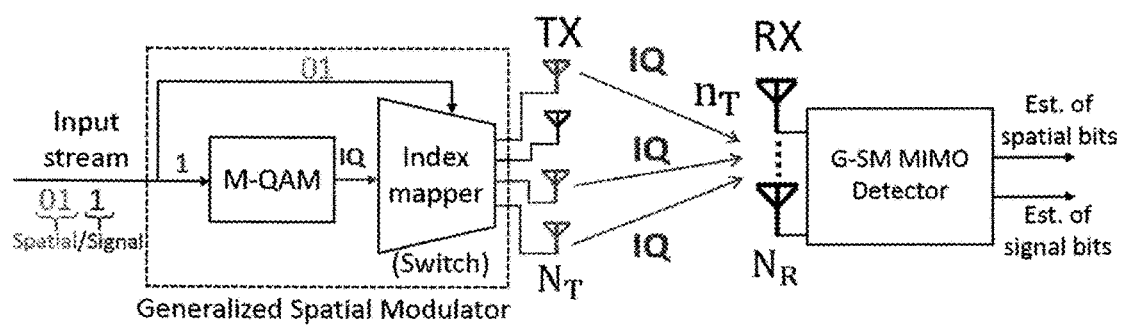
FIG. 6 illustrates a scheme of performing antenna-index modulation on SM-MIMO.

FIG. 6 illustrates a scheme of performing antenna-index modulation on SM-MIMO. As mentioned, SM requires hardware components to switch among the selected antennas. The speed of spatial bits (i.e. index modulation bit) is therefore suffered. Further, the SM-MIMO is incompatible with OFDM-based communication systems because the subcarriers are affected by the antenna switching simultaneously. The incompatibility makes SM-MIMO impractical for real-world telecommunications.

Figure 7:
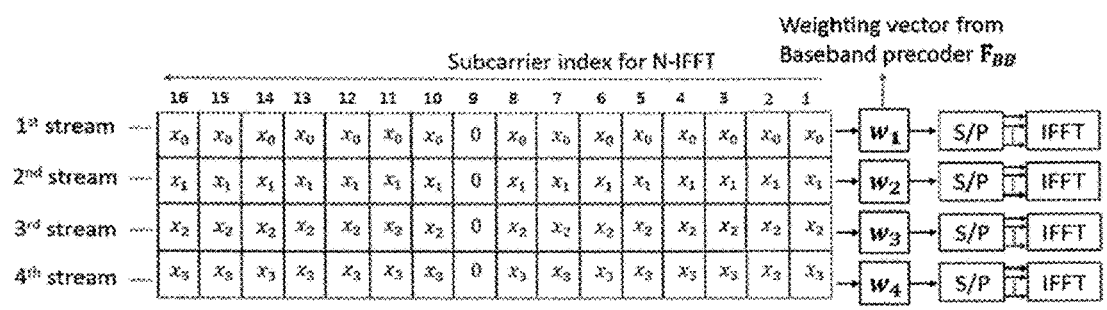
FIG. 7 shows a scheme of performing subcarrier-index modulation on OFDM-IM.

FIG. 7 shows a scheme of performing subcarrier-index modulation on OFDM-IM. Although OFDM-IM is inherently compatible with OFDM-based systems, it does not exploit the degree-of-freedom that MIMO can provide wisely. Those unselected and inactive subcarriers will not be able to transmit at all.

This invention proposes methods of beam-indexed spatial modulation (BISM) to resolve the above issues. This invention can adopt the combinations of MIMO channel eigen-modes to carry out index modulation. Thus, the low processing speed and incompatibility issues occurred in SM-MIMO can be solved. Additionally, the present invention provides a higher degree of efficiency with respect to spectrum and energy comparing to OFDM-IM.

In the context of MIMO, the eigen-modes are independent spatial channels in the MIMO channel decomposition systems. Each of the eigen-modes carries independent data stream in the MIMO communication system. In a MIMO-OFDM system, the maximum number of data streams in each subcarrier represents the degree-of-freedom of the system. The combinations of the selected data streams are encoded for index modulation in BISM.

Additionally, unlike OFDM-IM, the proposed BISM achieves a higher degree of efficiency with respect to energy (bps/Joule) and/or spectrum (bps/Hz) in view of different channels and system configurations. With comparison to conventional MIMO-OFDM, BISM improves the efficiencies of spectrum and energy and provides a higher degree of flexibility.

The following paragraphs will discuss the features and advantages that BISM can achieve as well as analysis results of performance simulations and capacity.

Assuming a MIMO channel has $N_T$ transmitting antennas and $N_R$ receiving antenna. Further, defining $N_B$ as the number of channel ranks of the MIMO channel and $n_B$ as the number of transmit beam in every transmission. It is noted that $N_T > N_B > n_B > 1$. It should also be noted that there are many alternatives to generate the transmit beams; they will be discussed below.

In one embodiment, the transmit beams can be generated by adopting singular value decomposition (SVD) to decompose the channel matrix $H \in C^{N_T \times N_R}$. The channel matrix H is:

$$H = U \Lambda V^H = \sum_{i=1}^{N_B} \sigma_i u_i v_i^H$$

U and V are unitary matrices and the column vectors, $u_i, v_i$ of U and V, respectively, are orthonormal. The $\Lambda$ is an $N_B \times N_B$ diagonal matrix with singular values $\sigma_i = \sigma_1$, $\sigma_2, \ldots, \sigma_{N_B}$ of the channel. Each sub-channel $H_i$ is obtained by $H_i = \sigma_i u_i v_i^H$, wherein $i=1, 2, \ldots, N_B$ representing the i-th eigen-mode as well as the i-th eigen-beam.

In one embodiment, the transmit beam can be obtained by using $\varphi_{ti}$ (angle of departure) and $\varphi_{ri}$ (angle of arrival) to decompose the channel matrix H. The channel matrix H can be decomposed by the angular steering vectors and is represented by $$H = \sum_{i=1}^{N_B} a_i e_r(\Omega_{ri}) e_t^*(\Omega_{ti})$$

$a_i$ is an attenuation of the ith beam, $e_t$ is a vector of angle of departure which equation is:

$$e_t(\Omega_{ti}) = \frac{1}{\sqrt{N_T}}[1, \exp(-j2\pi\Delta_t\Omega_{ti}),$$

$$\exp(-j2\pi 2\Delta_t\Omega_{ti}), \ldots, \exp(-j2\pi(N_T-1)\Delta_t\Omega_{ti})]^T$$

Additionally, $e_r$ is a vector of angle of arrival which equation is:

$$e_r(\Omega_{ri}) = \frac{1}{\sqrt{N_T}}[1, \exp(-j2\pi\Delta_r\Omega_{ri}),$$

$$\exp(-j2\pi 2\Delta_r\Omega_{ri}), \ldots, \exp(-j2\pi(N_R-1)\Delta_r\Omega_{ri})]^T$$

where $\Delta_t$ is the distance between the antennas at the transmitter, $\Delta_r$ is the distance between the antennas the receiver, $\Omega_{ti}=\cos(\varphi_{ti})$ is cosine of the angel of departure at the transmitter, and $\Omega_{ri}=\cos(\varphi_{ri})$ is cosine of the angle of arrival at the receiver. Each sub-channel $H_i$ is obtained by $H_i=a_i e_r(\Omega_{ri})e_t^*(\varphi_{ti})$, $i=1, \ldots, N_B$ representing the i-th angular beam.

The transmitter beamformer can allocate a power on the $n_B$ transmit beams (out of $N_B$ beams) at every transmission. The receiver can detect the reliability in the spatial domain by using the independent spatial signatures $H_i$. Therefore, the achievable rate $R_{BISM}$ can be represented by the spatial bits and the $n_B$ streams of signal bits:

$$R_{BISM} = \left\lfloor \log_2\binom{N_B}{n_B}\right\rfloor + n_B\log_2 M$$

The first term on the right-hand side of the above $R_{BISM}$ equation is the spatial bits through generalized spatial modulation in the beam space. The second term is M-ary amplitude-phase modulation through $n_{13}$ spatial multiplexing.

The BISM codebook can be designed in accordance with the transmission sub-channel. The number of data streams equals to $n_B$ plus one stream provided for the index modulated spatial bits. The spatial bits determine the active eigen-beams for transmitting M-QAM symbols, and the inactive eigen-beams send over null signal space.

Figure 8:
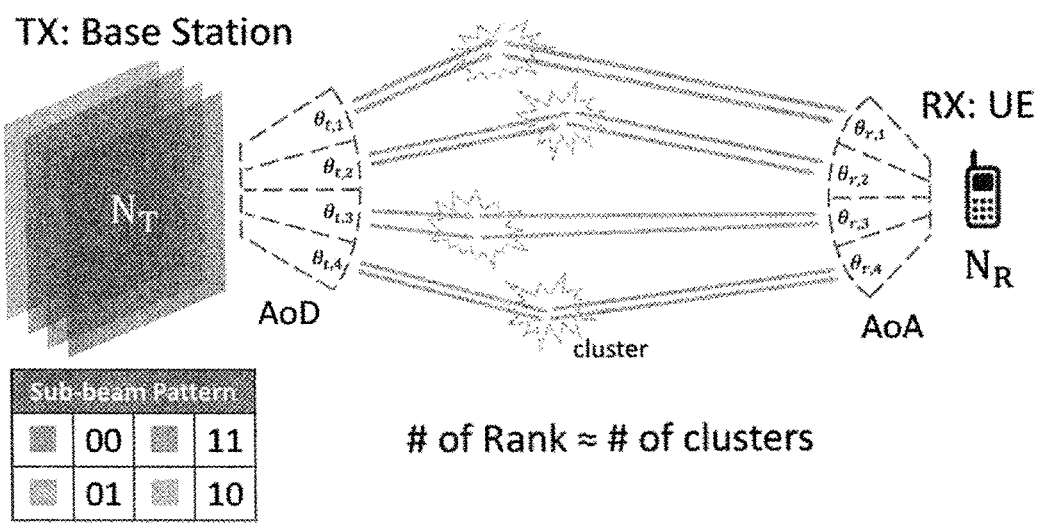
FIG. 8 shows a BISM scheme of the present invention.

FIG. 8 shows a BISM scheme of the present invention. Assuming the number of channel ranks $N_B$ equals to four ($N_B=4$), and the number of transmit beams $n_B$ equals to 3 ($n_B=3$). Thus, a number of stream (i.e. $N_S$) for BISM transmission can be designed accordingly: $N_S=n_B+1$ (i.e. in this case, $N_S=4$).

Table 2 demonstrates a BISM spatial constellation based on eigen decomposition with the previous assumptions: $N_B=4$, $n_B=3$. It should be noted that $x_i$ is the QAM modulated symbol and $i=1, 2, \ldots, n_B$

TABLE 2 demonstrates a BISM spatial constellation based on the previous assumptions

| Selected eigen-beam index | Spatial bits | Sub-channel | BISM codeword |
|---|---|---|---|
| 1, 2, 3 | 00 | $\sum_{i\in\{1,2,3\}} H_i = \sum_{i\in\{1,2,3\}} \sigma_i u_i v_i^H$ | $[x_1, x_2, x_3, 0]^T$ |
| 1, 2, 4 | 01 | $\sum_{i\in\{1,2,4\}} H_i = \sum_{i\in\{1,2,4\}} \sigma_i u_i v_i^H$ | $[x_1, x_2, 0, x_3]^T$ |
| 1, 3, 4 | 10 | $\sum_{i\in\{1,3,4\}} H_i = \sum_{i\in\{1,3,4\}} \sigma_i u_i v_i^H$ | $[x_1, 0, x_2, x_3]^T$ |
| 2, 3, 4 | 11 | $\sum_{i\in\{2,3,4\}} H_i = \sum_{i\in\{2,3,4\}} \sigma_i u_i v_i^H$ | $[0, x_1, x_2, x_3]^T$ |

Assuming the spatial bits in transmitted data is binary constituted by "10". The sub-channels $H_1$, $H_3$, $H_4$ containing the $1^{st}$, $3^{rd}$, and $4^{th}$ eigen-beams (or eigen-modes) are selected to transmit signals. The BISM codeword uses the corresponding stream index to carry different QAM modulated symbols, such as $[x_1, 0, x_3, x_4]^T$. As discussed, SVD is adopted to decompose the channel matrix, the effective channel, composed of the precoder, channel and combiner, is equivalent to parallel channel (e.g. diagonal matrix). Each symbol in the codeword maps to the corresponding eigen-beam; thus, the eigen-beam can be selected by using difference codeword.

BISM originated from spatial modulation (SM) and generalized spatial modulation (GSM). BISM is advantageous over SM-MIMO and OFDM-IM because it uses eigen-beam selection rather than antenna selection to represent the spatial bits. The advantages of BISM include but no limit to the following:

i) it provides an enhanced transmission data rate without hardware constraint caused by antenna switch;
  ii) it is compatible with MIMO-OFDM system;
  iii) it is energy efficient;
  iv) it provides a better performance of bit error rate (BER);
  v) the trade-off between spectral efficiency (SE) and energy efficiency (EE) is balanced; and
  vi) it is compatible with multiuser MIMO-OFDM systems.

Enhanced Transmission Data Rate without Hardware Constraint Caused by Antenna Switch As discussed, the processing speed of index modulation bit is restrained by antenna switching in SM-MIMO. However, BISM uses eigen-beam combinations to represent spatial bits. Therefore, instead of switching antennas on and off, the eigen-beam combinations can be configured in the baseband.

Further, the transmission data rate in BISM is as fast as the system's symbol rate determined by channel bandwidth. For example in IEEE 802.11a, the bandwidth for each sub-channel and the symbol rate can be as high as 20 MHz. On the other hand, in SM-MIMO systems, the index bit transmission rate is dominated by the antenna switching rate which is as slow as 2000 times of switching per second. Hence, in the absence of antenna switching restriction, BISM helps to enhance the index bit transmission rate than the SM-MIMO system by $10^4$ times faster.

MIMO-OFDM System Compatibility

The issue of SM-MIMO's incompatibility with MIMO-OFDM has been iterated. The reason is the subcarriers in OFDM system are vulnerably affected by the antenna index selection. The BISM of the present invention exploits the combinations of eigen-beams for index modulation. The eigen-beams are equivalent to the MIMO channel eigenmodes in each of the subcarriers in MIMO-OFDM system.

Figure 9:
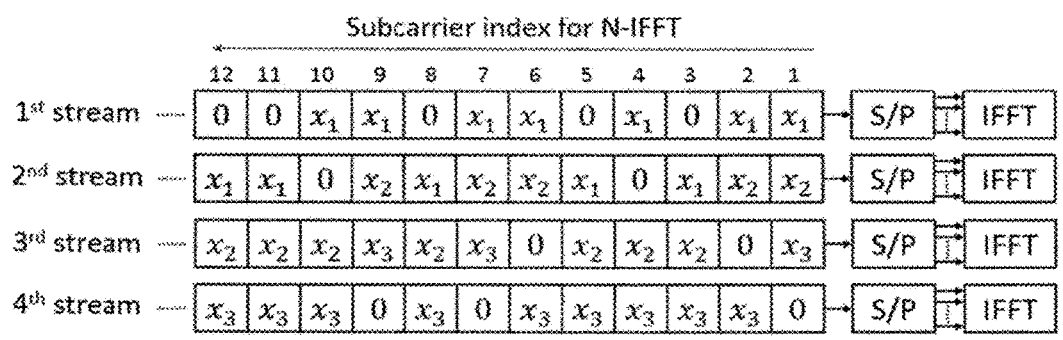
FIG. 9 shows an example of performing BISM on MIMO-OFDM.

FIG. 9 shows an example of performing BISM on MIMO-OFDM system ("MIMO-OFDM-BISM"). Assuming $N_B=4$ and $n_B=3$. Additionally, each eigen-mode carries one independent data stream; the combinations of data stream index carry the index modulation in baseband.

Energy Efficiency

Unlike conventional MIMO system having $N_B$ ranks, MIMO-OFDM-BISM of the present invention selects a subset of $n_B$ ranks for the transmission of M-ary QAM symbols. Although less ranks (or data streams) are used to transmit data, BISM nevertheless is capable of carrying extra spatial bits by index modulation. Assuming a fixed power P is given to each data stream of conventional MIMO and MIMO-OFDM-BISM systems. Although in both scenarios the BER of M-ary QAM symbols in each data stream of MIMO-OFDM-BISM system remains the same, the overall power consumption after performing BISM is down to $n_B/N_B$.

FIG. 10 exemplarily demonstrates performing BISM on MIMO system ("MIMO-BISM"). Assuming $N_B=4$ and $n_B=3$. Further assuming that a fixed power is given to each data stream, the overall power consumption is then down to ¾ after performing BISM.

Bit Error Rate (BER) Performance

Figure 11:
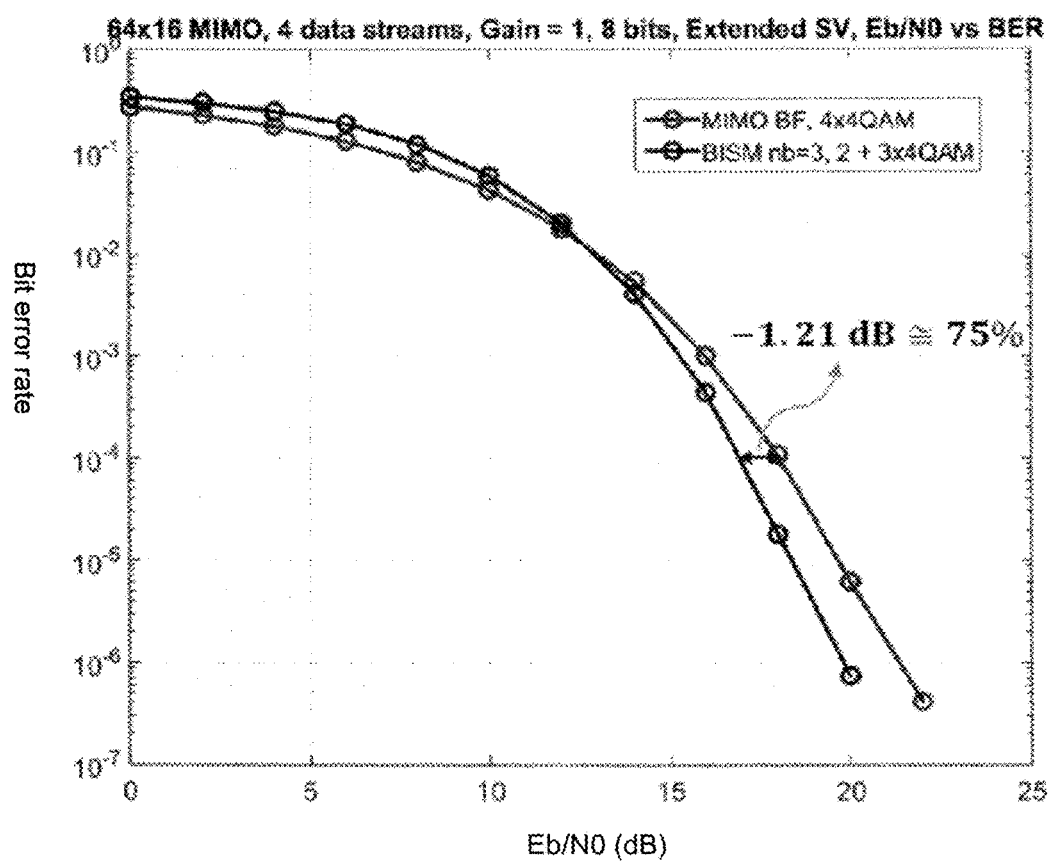
FIG. 11 illustrates the degrees of BER performance in both conventional MIMO and BISM scenarios.

FIG. 11 illustrates the comparison of BER performance in both conventional MIMO and MIMO-BISM scenarios. It appears that the MIMO-BISM system can achieve the same BER as the conventional MIMO system (without BISM) but with lower $E_b/N_0$. For instance, assuming the transmission rate for transmitting a subcarrier is 8-bit and three transmitted data streams ($N_B=3$) are chosen, the MIMO-BISM system shows the performance of −1.21 dB $E_b/N_0$ at $10^{-5}$ BER. The lower $E_b/N_0$ value shows BISM can effectively increase energy efficiency.

Spectral Efficiency (SE) and Energy Efficiency (EE) Trade-Off

The question of how to balance between spectral efficiency (SE) and energy efficiency (EE) is a common question concerning in wireless communication systems. In BISM, assuming $n_B=N_B-1$, the achievable rate $R_{BISM}$ is:

$$R_{BISM} = \left\lfloor \log_2 \binom{N_B}{N_B-1} \right\rfloor + (N_B-1)\log_2 M =$$

$$\left\lfloor \log_2 \binom{N_B}{1} \right\rfloor + (N_B-1)\log_2 M \geq N_B \log_2 M, \text{ if } N_B \geq M$$

It is noted that M is the order of M-QAM modulation symbols. As far as spectral efficiency is concerned, if $N_B \geq M$, then a more spatial bits can be obtained by performing BISM than using a mere spatial multiplexing in conventional MIMO. In such instance, only $N_T-1$ RF chains are used so as to reduce the complexity of fully turn-on spatial multiplexing.

In another extreme case where only one beam is active. The achievable rate $R_{BISM}$ is:

$$R_{BISM} = \left\lfloor \log_2 \binom{N_B}{1} \right\rfloor + \log_2 M$$

In the extreme case, BISM is equivalent to spatial modulation, featuring with low complexity and high energy efficiency (bps/Joule).

Figure 12A:
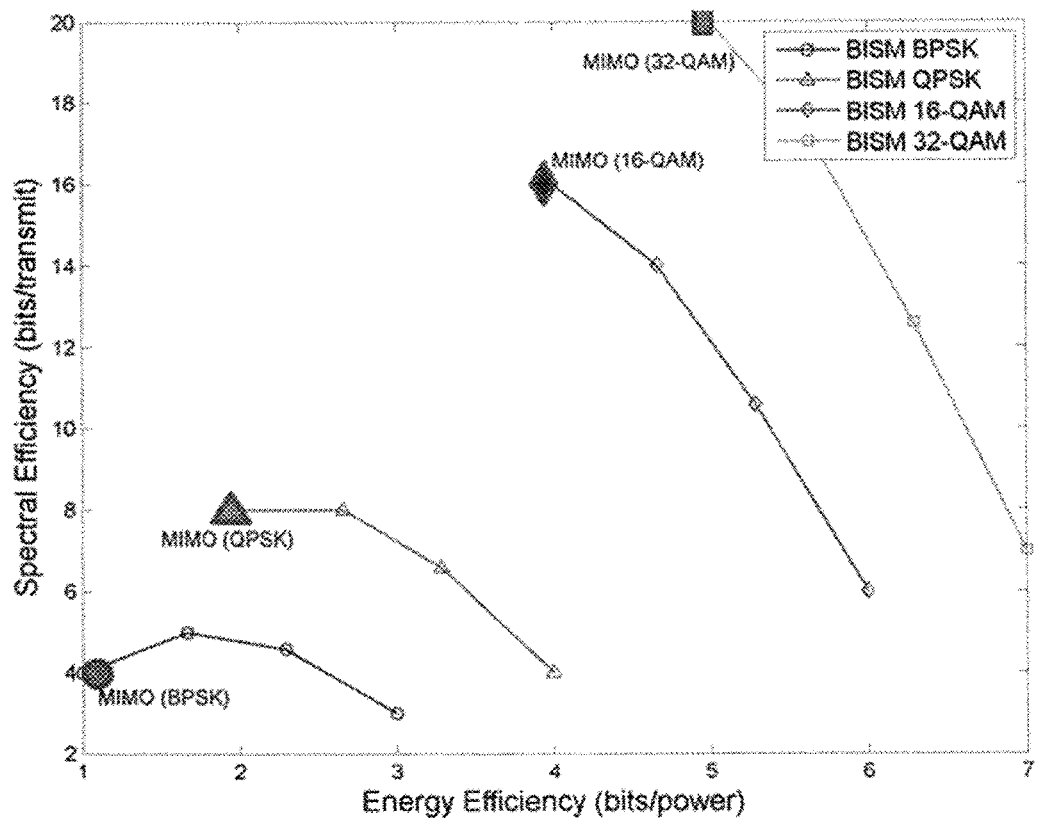
FIG. 12(a) shows trade-off between SE and EE.

FIG. 12(a) shows the trade-off between SE and EE. Assuming there are five data stream ($N_S=5$) and the active data streams $n_B$ are 4, 3, 2 and 1. It should be noted that if $n_B=N_S=4$, that means a comparison is made between a conventional MIMO and a MIMO-BISM systems.

The active data streams are loaded with M-ary QAM modulation symbols. Assuming various modulations including BPSK, QPSK, 16-QAM and 32-QAM are all considered. It appears that a higher degree of spectral efficiency can be achieved in both conventional MIMO and MIMO-BISM systems when a higher order M-ary QAM presents. As shown in FIG. 12(a), it appears that the MIMO-BISM system always has a higher EE than the conventional MIMO system if the same order of M-ary QAM symbols are loaded. With comparison to MIMO-BISM, the conventional MIMO system generally has a higher spectral efficiency. Also illustrated in FIG. 12(a), in some cases the MIMO-BISM system can still have a higher spectral efficiency even at a low order QAM.

Figure 12B:
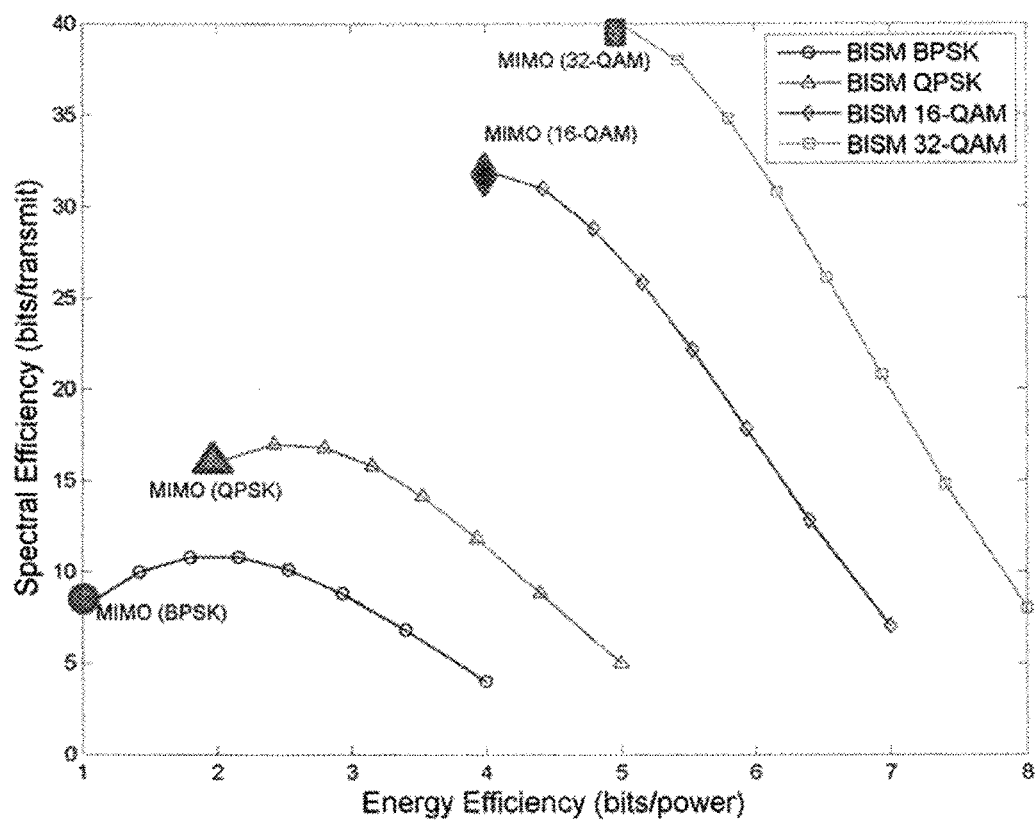
FIG. 12(b) illustrates trade-off between SE and EE in the condition where there are eight data stream ($N_S=8$) and the active data streams $n_B$ are 8, 7, . . . and 1.

Similarly, FIG. 12(b) illustrates trade-off between SE and EE in the condition where there are eight data stream ($N_S=8$) and the active data streams $n_B$ are 8, 7, . . . and 1.

The capacity of BISM ($C_{BISM}$) can be expressed by the below equation contributed by the spatial domain (i.e. the first term at the right-hand side) and signal domain (i.e. the second term also at the right-hand side).

$$C_{BISM} = \sum_{i=1}^{n_B} \log_2\left(\left|I_{N_B} + \frac{E_s}{N_0} H_i H_i^H\right|\right) + \left\lfloor \log_2 \binom{N_B}{n_B} \right\rfloor (1 - P_{e,bit})$$

The capacities from the two domains are traded off with each other, or reconfigurable with different setup of $n_B$. In the absence of loss of generality, BISM sum rate can be expressed as the summation of $n_B$ MIMO sub-channels and the index modulation bits throughput.

$$P_{e,bit} \leq \sum_j \sum_k \frac{d(j,k)}{M} 2^{2N_R+1} \left(\frac{N(j,k)}{n_T}\right)^{-N_T} \left(\frac{E_s}{N_0}\right)^{-N_R}$$

It is noted that $E_S$ is the M-ary QAM symbol energy, $N_0$ is the variance of AWGN (additive white Gaussian) noise, d(j, k) is the number of bits in difference (or Hamming distance) between two index modulation codeword, and N(j, k) is the number of distinct columns between two sub-MIMO channels.

Figure 13:
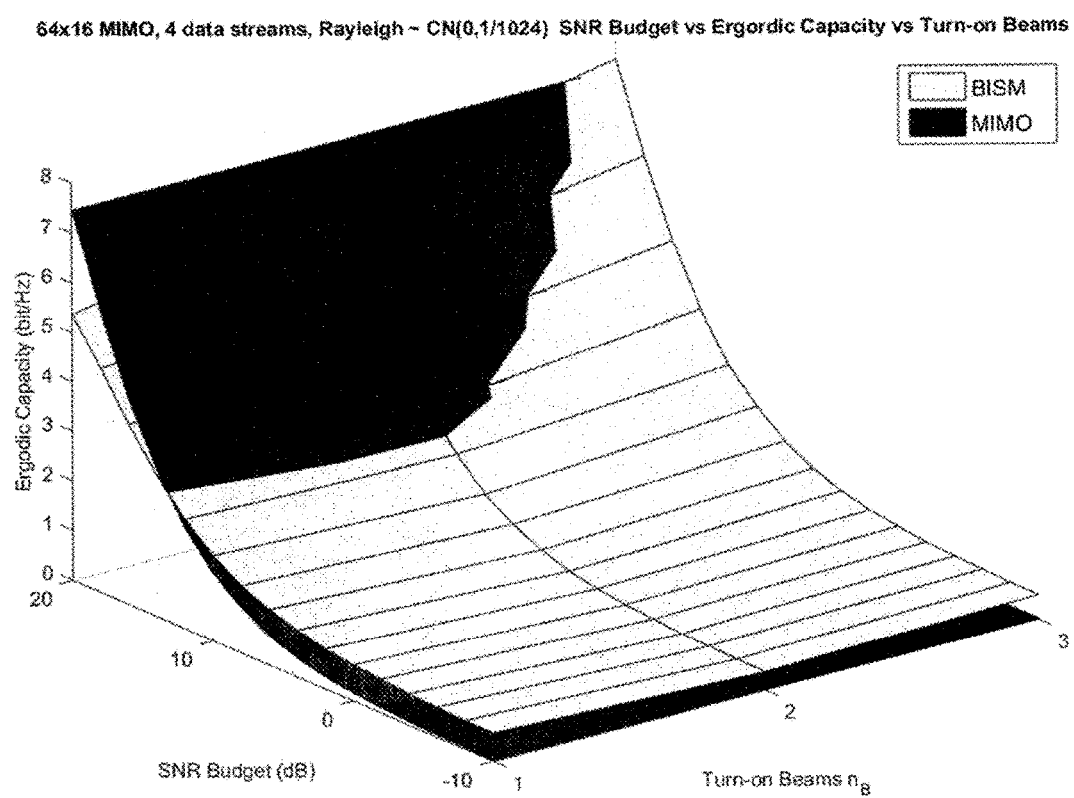
FIG. 13 shows ergodic capacities of a conventional MIMO and MIMO-BISM systems in view of various SNR.

FIG. 13 shows ergodic capacities of a conventional MIMO and MIMO-BISM systems in view of various SNR. The grey part illustrates the distribution of MIMO-BISM, while the black part is that of the conventional MIMO.

As can be seen, when at the low SNR region, it is more spectral efficient to turn on less beams. On the other hand, as the increase of SNR, in order to achieve a higher data rate than that in MIMO, more beams need to be turned on. As mentioned early, in a high SNR scenario and when a sufficient number of data streams ($n_B$) are utilized, BISM's capacity increases proportionally and surpass the capacity of the conventional MIMO as more beam patterns being used. As more beam patterns are turned on, more diversity gains and multiplexing gains can be achieved.

Compatible with Multiuser MIMO-OFDM Systems

In a multi-user MIMO-OFDM communication system, the subcarriers are divided into sub-blocks as radio resources. The blocks of the radio resources are then allocated to multiple users for multiple accesses.

The BISM of the present invention exploits index modulation in the eigen-mode dimension which can consequently be compatible with the way in which resources are allocated in a multiuser MIMO-OFDM system. This makes BISM advantageous over SM-MIMO and OFDM-IM systems. The former cannot adopt the same resource allocation method, while the resource allocation of the latter is less flexible because OFDM-IM exploits index modulation in its subcarriers.

Exemplary Embodiments

General Diagram of Switchable System Between BISM and MIMO

Figure 14:
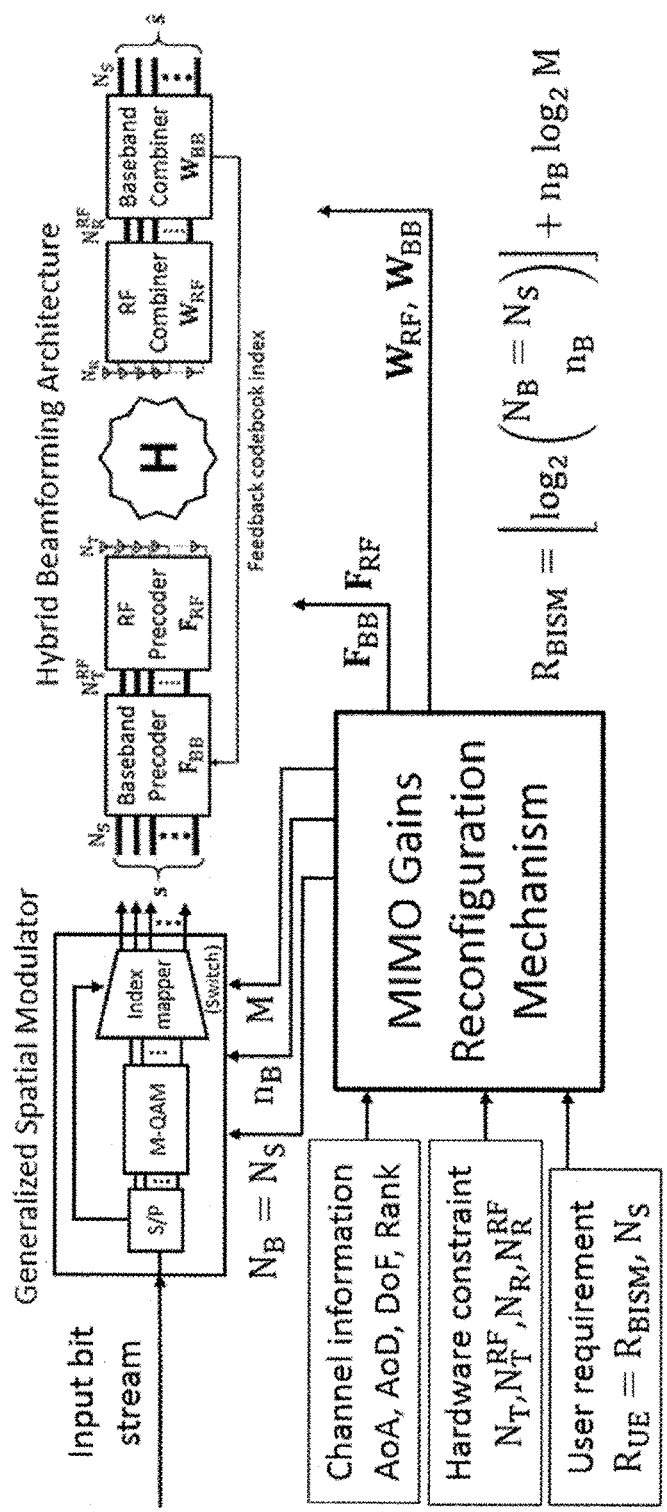
FIG. 14 shows an exemplary system of applying BISM to a conventional MIMO

FIG. 14 shows an exemplary system of performing BISM to a conventional MIMO (i.e. MIMO-BISM). The procoders $F_{BB}$ and $F_{RF}$, and combiners $W_{BB}$ and $W_{RF}$ in the system are decided by the channel information and hardware constraint. The reconfiguration mechanism determines to adopt either the MIMO-BISM or the conventional MIMO based on the channel information and user requirements. The settings of precoders and combiners are irrelevant to the switching between MIMO-BISM and the conventional MIMO. Therefore, it is feasible to apply BISM and reconfiguration mechanism to the current communication system.

BISM Realization Example for MIMO OFDM System

Figure 15:
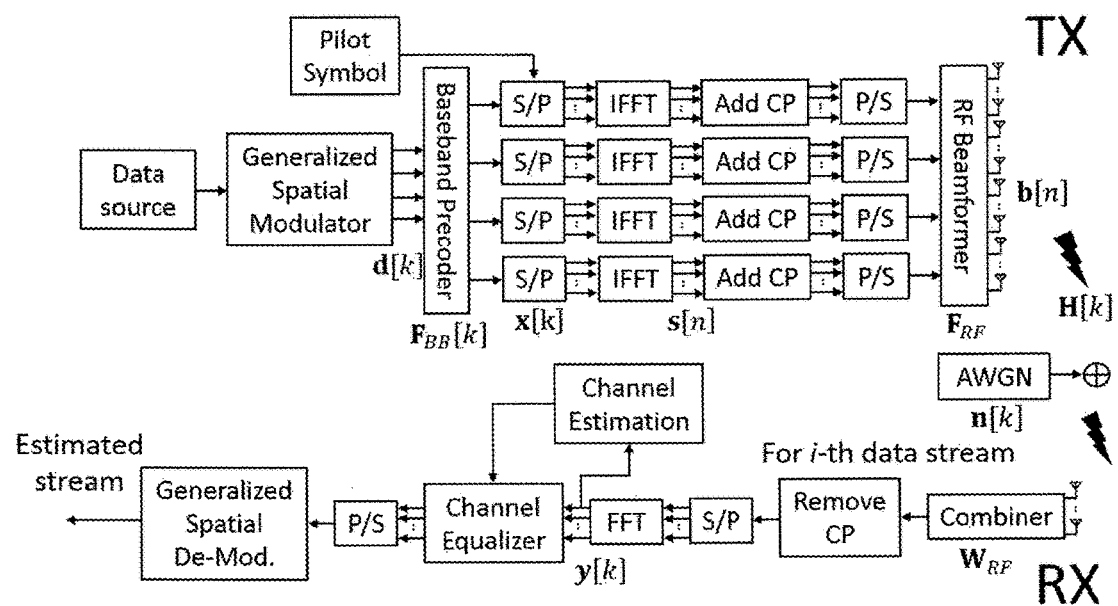
FIG. 15 is a block diagram showing how to apply BISM into a MIMO-OFDM having N subcarriers.

FIG. 15 is a block diagram showing how to performing BISM on a MIMO-OFDM having N subcarriers. In one embodiment, the number of data stream $N_S$ equals to MIMO channel rank in each subcarrier. As for as the k-th (k=1, 2, . . . , N) subcarrier is concerned, the data vector d[k] of length $N_S$ contains $N_S - n_B$ digital modulation symbols (e.g. M-QAM symbol) and $n_B$ null elements. By the beam index on the data vector, the $$\binom{N_s}{n_B}$$

data vector patterns represent the spatial symbols. The transmit precoding symbol vector is:

$$x[k] = F_{BB}[k]d[k]$$

It is noted that $F_{BB}[k]$ is a baseband precoder matrix. The post-IFFT symbol vector is s[n], n=1, 2, . . . , N where each element within s[n] is:

$$s_l[n] = \frac{1}{\sqrt{N}} \sum_{k=0}^{N-1} x_l[k] e^{j\frac{2\pi}{N}kn}, l = 0, 1, \ldots, N_s - 1$$

Assuming the system is operated with coherence time and coherence bandwidth, analog beamforming matrix ($F_{RF}$) of a hybrid beaming MIMO can be applied during one OFDM symbol.

The transmit symbol vector at time n is b[n] representing as b[n]=$F_{RF}$s[n], n=0, 1, . . . , N−1. It is noted that $F_{RF}$ is the analog beamforming matrix. The received symbol vector on k-th subcarrier of an OFDM symbol at the receiver in a baseband is:

$$y[k] = W_{RF}H[k]F_{RF}F_{BB}[k]d[k] + W_{RF}n[k]$$

It is noted that H[k] is the frequency domain full channel matrix for the k-th subcarrier, $W_{RF}$ is the analogy post-coder matrix and n[k] is the complex AWGN vector.

The MIMO channel in the k-th subcarrier, H[k], can be decomposed by using SVD, so that $$H[k] = U[k]\Sigma[k]V^H[k].$$

Additionally, the eigen-modes in each of the subcarriers are exploited in BISM for index modulation.

Figure 16:
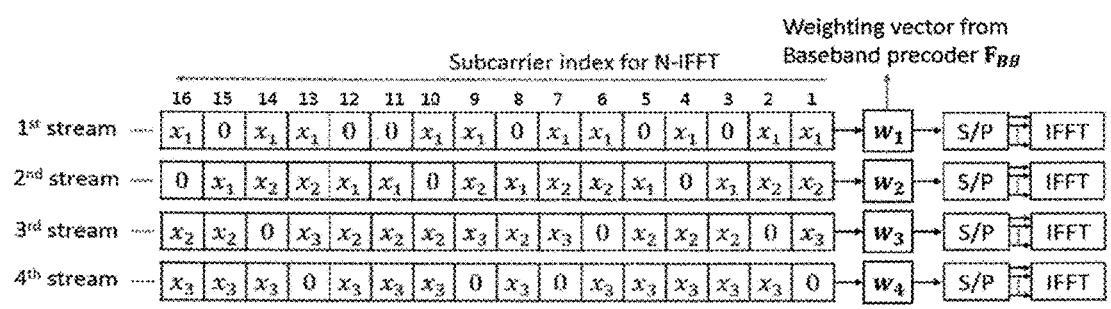
FIG. 16 is an example of applying BISM to a MIMO-OFDM system.

For example, as shown in FIG. 16, assuming BIMS is performing on a MIMO-OFDM system where there are four eigen-modes in each subcarrier, $N_S=4$, $n_B=3$ and $x_1$, $x_2$, $x_3$ are M-ary QAM. The location of zero is selected by the input bits with random distribution. As shown, each location of zero represents $$\left\lfloor \log_2\binom{N_s=4}{n_B=3} \right\rfloor = 2 \text{ bits.}$$

Joint Design of BISM in OFDM-IM

The concept of BISM in the eigen-mode dimension can be implemented jointly with OFDM-IM as two-dimensional index modulation scheme. Assuming in a MIMO system there are $N_S$ eigen-modes and N subcarriers dividing into G smaller and manageable OFDM-IM sub-block each containing $N_c$ subcarriers to perform IM, wherein N=G*$N_c$.

For each sub-block, $n_0$ out of $N_c$ available subcarriers can be selected as the active subcarriers based on the index selection bits. Each of the active subcarriers sends over M-QAM modulation symbols based on the $p_2$ modulation bits.

For each OFDM-IM frame, the spectral efficiency R is $$R = \left(\log_2\binom{N_sN_c}{n_0} + n_0\log_2(M)\right)G$$

FIG. 17 is an exemplary joint design of BISM and OFDM-IM where $N_s=4$, $N_c=4$, and $n_0$. Each resource block of $N_s \times N_c$ degree-of-freedoms can be exploited for index modulation. Thus, as shown in FIG. 17, there are $N_s \times N_c = 4 \times 4$ degree-of-freedoms for index modulation.

The above-described embodiments of this invention are presented for purposes of illustration and not of limitation. Of course, those skilled in the art will recognize many modifications may be made to this configuration without departing from the scope of the disclosed aspects.

What are claimed are as follows:

1. A first method of beam-indexed spatial modulation (BISM) for a multiple-input and multiple output (MIMO) module having a transmitter end and a receiver end, comprising:
   step a) confirming that the MIMO module has a plurality of beams, the number of the plurality of beams is $N_B$, each of the plurality of beams is an individual channel constituted by one of antennas at the transmitter end and one of antennas at the receiver end;
   step b) providing an index to the $N_B$ beams through a $N_T \times N_R$ channel matrix H, wherein $N_T$ are an integer number of a plurality of transmitting antennas and $N_R$ are an integer number of a plurality of receiving antennas, which H is decomposed by the singular value decomposition and represented by $$H = U\Lambda V^H = \sum_{i=1}^{N_B} \sigma_i u_i v_i^H$$

wherein U is a unitary matrix, V is a unitary matrix, $u_i$, $i=1, \ldots, N_B$, are orthonormal column vectors of U, and $v_i$, $i=1, \ldots, N_B$, are orthonormal column vectors of V, $\Lambda$ is an $N_B \times N_B$ diagonal matrix with singular values $\sigma_i = \sigma_1, \sigma_2, \ldots, \sigma_{N_B}$ of the MIMO module, and $N_B$ is an integer;

step c) evaluating a communication condition of the plurality of beams and selecting a plurality of sub-channels, which number is $n_B$, out of the individual channels of the plurality of beams as transmit beams, and transmitting a signal and the index via the antennas of the transmit beams at the transmitter end; and step d) receiving and recognizing the index at the receiver end, by the antennas, and further detecting the symbols of the transmit beams received at the receiver end.

2. The method of claim 1, wherein the MIMO module is compatible with orthogonal frequency-division multiplexing (OFDM).

3. The method of claim 1, wherein the index is represented by either a plurality of M-ary quadrature amplitude modulation symbols or a plurality of spatial bits.

4. The method of claim 3, wherein the spatial bits are binary.

5. The method of claim 1, wherein the number of the transmit beams equals to the number of the sub-channel, $n_B$, plus one.

6. The method of claim 5, wherein the index comprises a zero bit to represent those unselected sub-channels.

7. A second method of beam-indexed spatial modulation (BISM) for a multiple-input and multiple output (MIMO) module having a transmitter end and a receiver end, comprising:

step a) confirming that the MIMO module has a plurality of beams, the number of the plurality of beams is $N_B$, each of the plurality of beams is an individual channel constituted by one of antennas at the transmitter end and one of antennas at the receiver end;

step b) providing an index to the $N_B$ beams through a channel matrix H which is decomposed by the angular steering vectors and represented by:

$$H = \sum_{i=1}^{N_B} a_i e_r(\Omega_{ri}) e_t^*(\Omega_{ti})$$

wherein $a_i$ is an attenuation of the i-th beam, $e_t(\Omega_{ti})$ is a vector of angle of departure representing by $$e_t(\Omega_{ti}) = \frac{1}{\sqrt{N_T}}[1, \exp(-j2\pi\Delta_t\Omega_{ti}),$$
$$\exp(-j2\pi 2\Delta_t\Omega_{ti}), \ldots, \exp(-j2\pi(N_T-1)\Delta_t\Omega_{ti})]^T$$

$e_r(\Omega_{ri})$ is a vector of angle of arrival representing by $$e_r(\Omega_{ri}) = \frac{1}{\sqrt{N_T}}[1, \exp(-j2\pi\Delta_r\Omega_{ri}),$$
$$\exp(-j2\pi 2\Delta_r\Omega_{ri}), \ldots, \exp(-j2\pi(N_R-1)\Delta_r\Omega_{ri})]^T$$

where $\Delta_t$ is the distance between the antennas at the transmitter, $\Delta_r$ is the distance between the antennas at the receiver, $\Omega_{ti}=\cos(\varphi_{ti})$ is cosine of the angle of departure at the transmitter, wherein $\varphi_{ti}$ is an angle of departure at the transmitter, and $\Omega_{ri}=\cos(\Omega_{ri})$ is cosine of the angle of arrival at the receiver end, wherein $\varphi_r$, is an angle of arrival at the receiver, $N_T$ are the number of a plurality of transmitting antennas and $N_R$ are the number of a plurality of receiving antennas; and step c) evaluating a communication condition of the plurality of beams and selecting a plurality of sub-channels, which number is $n_B$, out of the individual channels of the plurality of beams as transmit beams, and transmitting a signal and the index via the antennas of the transmit beams at the transmitter end; and step d) receiving and recognizing the index at the receiver end, by the antennas, and further detecting the symbols of the transmit beams received at the receiver end.

* * * * *